April 6, 1954     E. H. BALZ     2,674,548
METHOD OF TREATING GLASS CLOTH
Filed May 28, 1951     3 Sheets-Sheet 1

INVENTOR
EMIL H. BALZ
BY Toulmin & Toulmin
ATTORNEYS

April 6, 1954     E. H. BALZ     2,674,548
METHOD OF TREATING GLASS CLOTH
Filed May 28, 1951     3 Sheets-Sheet 2

INVENTOR
EMIL H. BALZ
BY Toulmin & Toulmin
ATTORNEYS

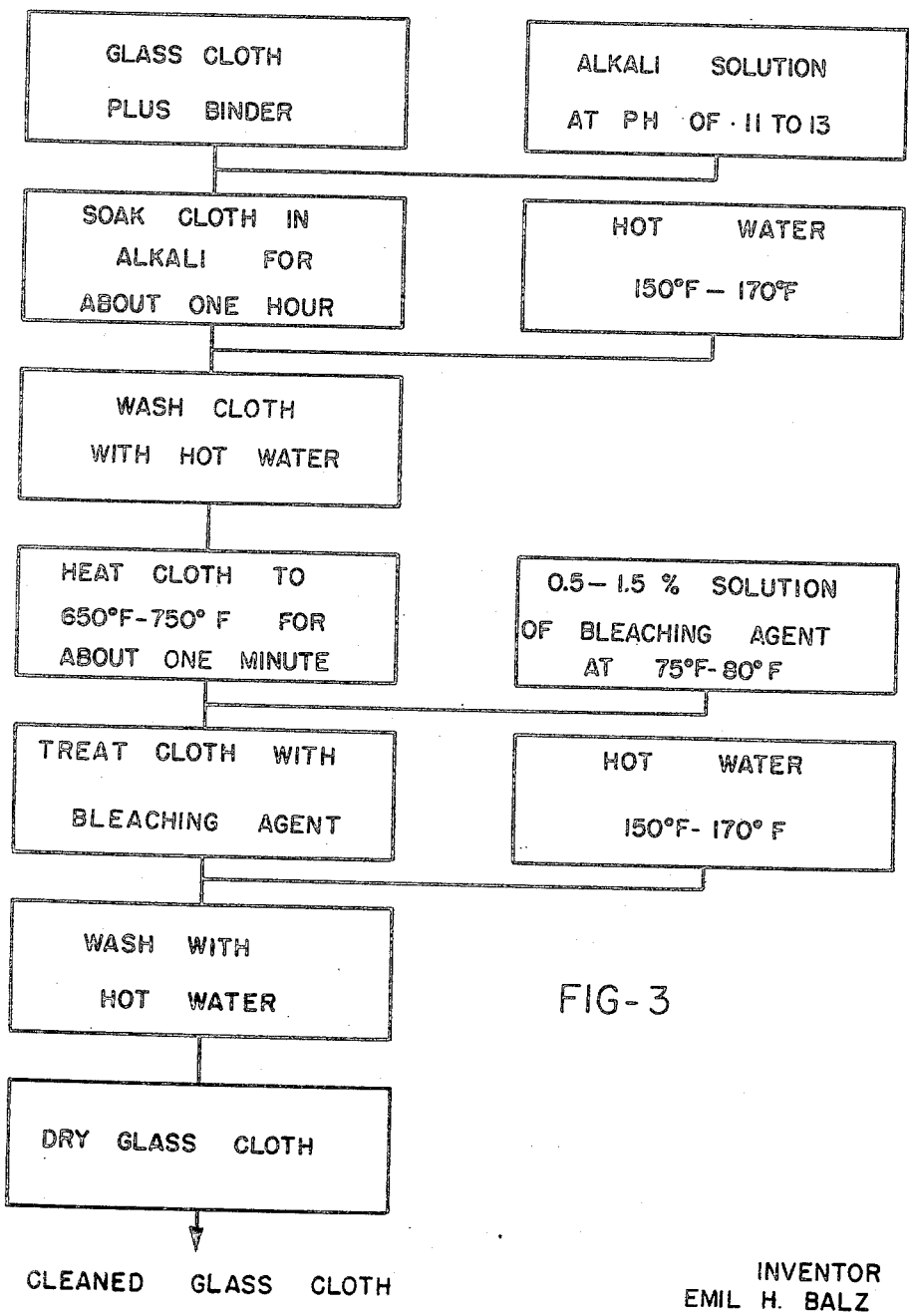

Patented Apr. 6, 1954

2,674,548

UNITED STATES PATENT OFFICE 2,674,548

METHOD OF TREATING GLASS CLOTH

Emil H. Balz, Waterville, Ohio, assignor to Glass Fibers Inc., Waterville, Ohio, a corporation of Ohio Application May 28, 1951, Serial No. 228,623

13 Claims. (Cl. 134—2)

This invention relates to glass cloth. More particularly the invention relates to a treatment for glass cloth to render the same useful in the making of laminations with resinous materials.

This application is related to my co-pending application, Serial No. 228,624, filed May 23, 1951.

In the production of glass cloth the glass composition is first made molten and caused to flow from extremely small orifices from which it is picked up by a revolving drum or an air or high pressure steam blast and pulled into long fine fibers. The individual fiber is smooth, substantially cylindrical and normally has a diameter of about .00021 to about .00040 inch. The fibers may then be grouped in such fashion as to form a thread of parallel fibers and thereafter a group of the continuous fibers is sent on to the textile machines for weaving into cloth.

In order to minimize friction in processing, the fibers while they are being drawn out are treated with a water dispersion of a lubricant or binder material prior to formation of the groups. This binder material, which generally consists of a vegetable lubricating oil, starch and very small amounts of wetting and dispersing agents, etc., coats the fibers and remains thereon in the finished glass cloth. This binder is present to the extent of about 1.5% to 2.0% by weight on the dry finished glass cloth.

The presence of this binder aids in the textile operation but seriously affects the ability of the glass cloth to form laminates with other materials, such as synthetic resins. Accordingly when it is desired to form such laminates treatment of the glass cloth to remove the binder material is required in order to obtain satisfactory adhesions between the cloth and the resin.

Present known methods for the removal of the binder require among other steps the treatment of the cloth at temperatures of the order of 600 to 700° F. for prolonged periods, generally 55 to 60 hours. Such methods, of course, seriously hinder production, require an excessive amount of equipment for a given production and in the overall are exceedingly expensive.

The present invention contemplates the provision of a novel method for the removal of the binder material from the glass cloth utilizing a short moderate heat cycle.

The invention further contemplates a method of providing a scrupulously clean glass cloth surface particularly suitable for combining with resinous compositions.

The invention also contemplates the provision of a production method for the cleaning of the glass cloth which eliminates the necessity for large storage space requirements during the processing steps.

I have found that these and other objects of the invention may be attained by treating the glass cloth containing the oil-starch binder material with a strong alkali and thereafter heating the cloth for a matter of a minute or slightly longer at moderate temperatures. The alkali-treated binder is reacted by this treatment, and in effect is burned from the glass cloth.

In the practice of the invention it is preferred that the alkali have a pH of about 11 to 13 and that prior to exposure to the heating step the glass cloth be thoroughly washed to eliminate excess alkali therefrom. The wet cloth may then be subjected to the heating step to effect removal of the binder. Any slight discoloration present on the cloth due to decomposed binder may thereafter be eliminated by subjecting the cloth to the action of a bleaching agent, the excess of which may then be removed if necessary by further washing with water. It may be that under certain operating conditions to be more particularly noted hereinafter that a very small percentage of binder will remain on the cloth after ignition and this will also be removed by the action of the bleaching agent.

The treatment of invention is adaptable to all oil-starch binder materials and in substantially all proportions of these components. The oil of the binder is generally a lubricating oil of vegetable origin, such as castor, hydrogenated cottonseed, olive and coconut. Highly unsaturated oils due to their instability to light are not usually employed in the lubrication of fibers for glass cloth manufacture, but if so employed under selected conditions would also be removable from such cloth by the process of invention. The starch of the binder may be any of the normal starches of commerce and may include the slightly hydrolyzed or dextrinized materials. In addition to these primary components the binder may contain, in extremely small amounts, one or more substances such as gelatin, borax, polyvinyl alcohol, a cationic agent or other wetting and dispersing compounds.

All glass compositions used for the production of glass cloth may be suitably treated by the process of the invention.

These ingredients are set forth by way of illustration only since the inventive concept is applicable to the removal of all components which after treatment by the alkali are in such a condition as to render them readily removable from the cloth by the ignition step described in detail hereinafter. In most cases these secondary components may, of course, be readily selected in the first instance in order that the desired end be achieved.

Alkalis which are particularly suitable for the process of invention include sodium hydroxide, soda ash, and lime. Ammonia and organic alkalis such as morpholine and triethanolamine may also be effectively employed but are somewhat more difficult to handle in production operations. The prime requirements of the alkali for production purposes are that a pH of about 11 to 13 be attained and that the alkali have no deleterious effect on the cloth and that it be adaptable to simplified production equipment. Also alkalis which leave a residue on the cloth are to be avoided as the residue from the alkali might tend to deteriorate the cloth.

Bleaching of the cloth where necessary may be effected in any suitable medium which does not attack the glass cloth, the purpose of this step being primarily to effect complete cleaning of the cloth after the bulk of the binder material has been removed. Thus exposure of the cloth to an oxidizing atmosphere, such as oxygen gas, may effectively be employed. However, it is generally preferred for production purposes to utilize a bleaching solution, such as sodium hypochlorite in water. Other specific bleaching agents of the same general nature as for example calcium hypochlorite may be used subject to the limitations in their selection that they do not attack the glass and that for production purposes they leave little or no residue that may not be washed out with water. Calcium hypochlorite for example is more difficult to wash out while cost considerations prohibit the use of other components.

I have found that rather moderate temperatures of 700° F. to 1100° F. may be used to burn the binder from the alkali-treated glass cloth and that the time of exposure to the heat need only be very short, that is, in the range of about one to four minutes. For example, a glass cloth containing a binder material to the extent of about 1.8% on the weight of the cloth, the binder consisting essentially of 16 parts of starch and 2 parts of hydrogenated cottonseed oil and negligible amounts of other decomposable material was completely cleaned leaving no residue, by exposure to an oven temperature of between about 850° to 900° F. for about four minutes. At an oven temperature of 1000° to 1100° F. it was found to be possible to cleanse the same cloth in about 2 to 3 minutes. At oven temperatures in the range of 700° to 750° F. and an exposure time of about one minute, more than 95% of the binder material was removed from the cloth by the ignition, the remainder of less than 5% being readily removed by a supplemental treatment with a bleaching agent such as hypochlorite. The treatment of invention therefore permits of a very short operating cycle to be described more fully in the specific example detailed hereinafter.

It may be noted that the surface of the glass cloth cleaned by the alkali and heating treatment outlined acquires and retains throughout the processing a hydroxyl group since the glass is hydrolyzed to a slight extent by the action of the alkali. The presence of this anion assists adhesion between the glass and the resin layer to be applied thereto, and is of a particular benefit where a cationic agent such as methacrylate chromic chloride (Volan) is applied to the glass to form thereon an adsorbed film containing reactive double bonds which combine readily with organic materials such as the polyesters. The formation of these laminates is in general known to the art and forms no part of the present invention. However the subject matter contained in my copending application, Serial No. 235,161, filed July 5, 1951, is directed to an improvement of the known process of laminate formation.

The invention will be more fully understood by reference to the following detailed description and appended drawings wherein:

Figure 3 is a flow sheet of another modification of the invention.

Figure 1:
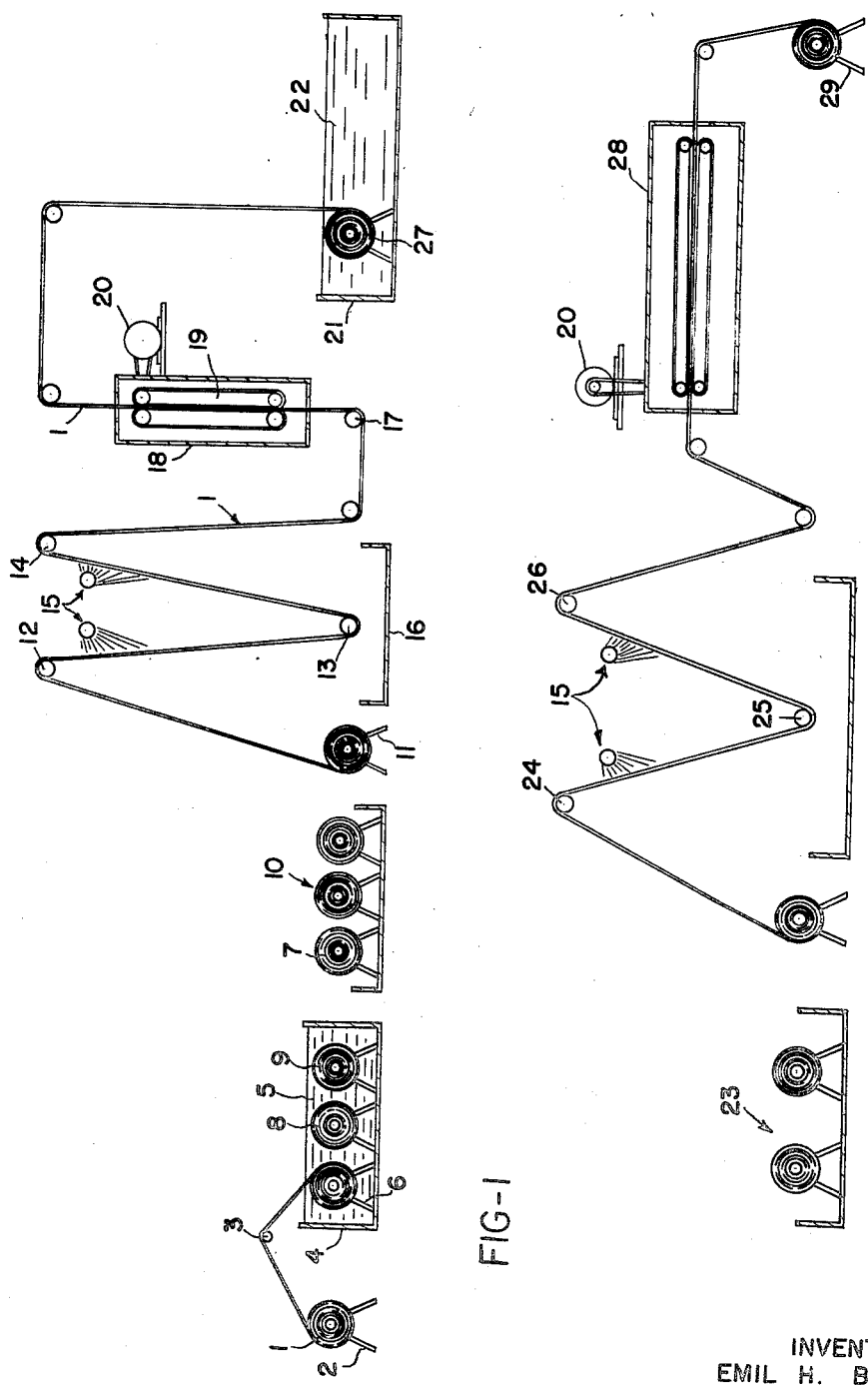
Figure 1 is a diagrammatic representation of apparatus used in the preferred embodiment of the invention.
Figure 2:
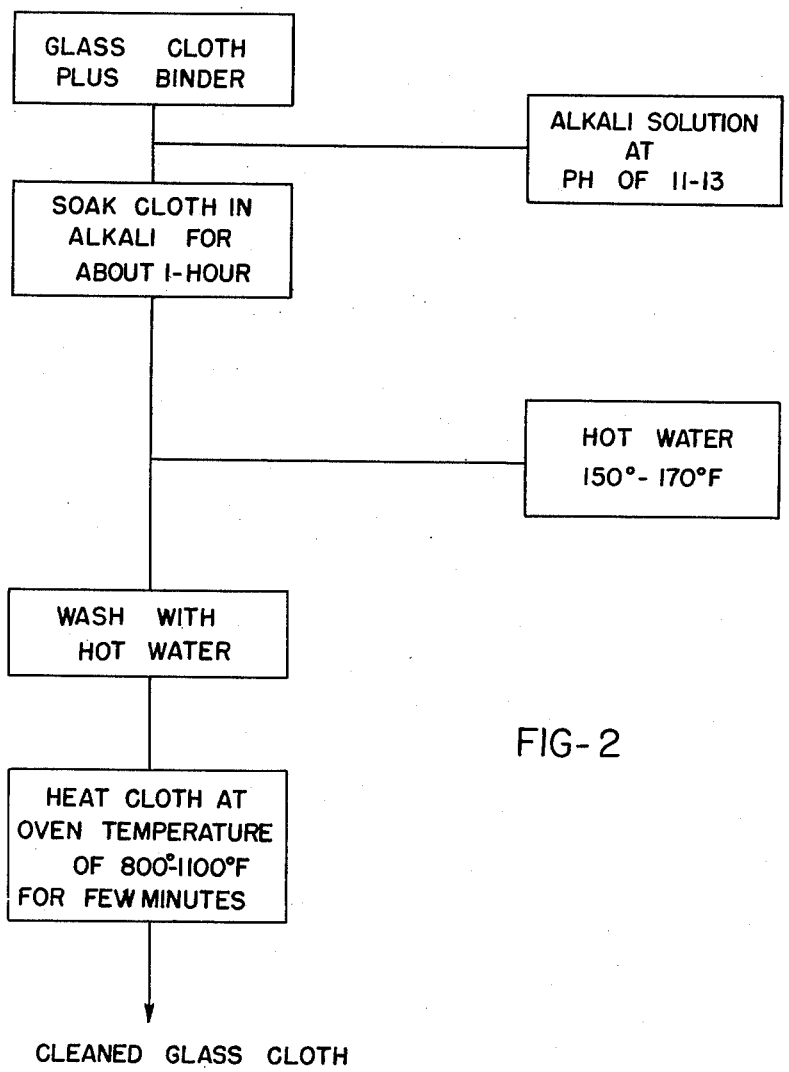
Figure 2 is a flow sheet illustrating the process of invention.

Referring to Figure 1, there is shown a roll of glass cloth 1 produced from standard "E" glass, the fibers of which during manufacture were treated with an aqueous binder material consisting by weight of about 2% of hydrogenated cottonseed oil (Pureco), about 8% of partially dextrinized starch (Globe Gum), about .06% of gelatin, about .13% of polyvinyl alcohol, about .2% of Tween 81 (partial esters of fatty acids and hexitolanhydrides combined with polyoxyethylene chains), about .4% of onyx cation X (fatty imidazoline derivative), the balance being water and a very small amount of borax to bring the pH of the dispersion into the range of 6.0 to 6.6. This binder material, minus the water content, is present to the extent of about 1.8% by weight on the dry glass cloth roll shown at 1.

The roll of glass cloth 1 is shown mounted upon a stand 2 and may be appropriately unreeled and passed over an idler roller 3, into a tank 4 containing an aqueous 0.1 to 1% solution of sodium hydroxide having a pH of 11-13 and indicated generally at 5. The cloth is rerolled in the solution on stand 6 and permitted to soak for about 1 hour whereupon it is removed from the alkaline solution and stored as at 7 to await further processing. It is clear that a number of rolls may be subjected to the action of the alkali at one time as indicated at 8, 9 and that a small storage space indicated generally at 10 will accommodate a considerable number of treated rolls.

The alkali treatment removes a portion of the starch as well as soluble borax and gelatin and renders the binder remaining on the cloth readily susceptible to the temperature treatment described hereinafter.

The alkali-treated roll upon removal from storage is first washed of excess alkali by unreeling the cloth from a stand 11 and passing it continuously over idler rolls 12, 13 and 14 and under water sprays indicated generally at 15. The water has a preferred temperature in the range of 150° to 170° F. and the glass cloth will not be completely neutralized thereby. For example, it has been found that repeated washings of the cloth under batch conditions will yield a minimum pH of the spent wash water in the range of 7.5 to 8.0. However, the excess alkali will be removed from the cloth by the spray directed on the cloth and a spent wash water pH in the above indicated range may be taken as the end point for this step in the procedure. A shallow pan 16 positioned under the spray directs the spent waste water to drainage or the same may be recirculated as desired.

The washed cloth upon leaving the water spray is passed under a spreader roll 17 and thence to oven 18, which operates at a temperature of approximately 750° F. to 800° F. and wherein a conveyor indicated at 19, driven through power means denoted at 20, supplies motive power to the cloth. The oven has an overall length of about 12 feet and the conveyor may be operated at controlled adjustable speeds of between about 2 to 30 feet per minute, and in the instance under consideration the cloth and conveyor were driven at about 12 feet per minute, the cloth assuming in the latter part of the oven traverse a temperature of about 650° F. to 750° F.

The alkali treated binder, including the cation X, polyvinyl alcohol, oil and wetting agents, it has been found, is driven off to the extent of more than about 95% by the action of the heat which, as may be derived from the foregoing, is applied to a given portion of the cloth for only about one minute. Thus less than 5% of the binder will remain on the cloth after this treatment.

The heated glass cloth containing the binder material residue is then passed continuously into a tank 21 containing a 0.5% aqueous solution of sodium hypochlorite and having a temperature of about 75° to 80° F. Preferably the cloth is wound on reel 27 in the solution indicated at 22 and allowed to soak therein for about 30 minutes. Alternatively the cloth may be simply passed through the hypochlorite solution and stored as indicated generally at 23 in which case the storage time should also be approximately 30 minutes. Upon completion of the bleaching treatment the excess bleaching agent is washed from the cloth with water having a temperature in the range of 150° to 170° F. by passing over rolls 24, 25, 26 and thereafter dried in oven 28 and rolled up on reel stand 29. A completely cleaned glass cloth is attained in an overall production time for a given roll of less than about 2½ to 3 hours.

The cleaned glass cloth thus produced will laminate readily with silicone resin and when the cleaned cloth is first treated with a cationic agent such as Volan, as discussed briefly hereinbefore, a bond with the polyesters may be effected.

In a further embodiment of the invention the bleaching treatment set forth above may be eliminated by decreasing the speed of the oven conveyor and/or increasing the oven temperature. Thus it has been found that the glass cloth having the oil-starch binder described above may be completely cleaned of the said binder by passing the alkali treated and washed cloth through the oven at a speed of about 3 feet per minute, that is, a heating time of about 4 minutes the oven temperature being about 850° F. Further, at a speed of between about 3 to 6 feet per minute, that is, a heating time of between about 2 to 4 minutes and at an oven temperature of 1000° F. to 1100° F., the binder may also be completely removed and no necessity for the bleach treatment exists.

In each of the detailed examples set forth hereinbefore soda ash, lime, ammonia, triethanolamine or morpholine may be substituted for the sodium hydroxide, it being only necessary to guard against the customary effects of these compounds in production operations such as provision of hoods, etc.

Accordingly, by suitable regulation of time and temperature conditions in the oven, alkali treated cloth containing binder material in the quantities applicable to glass cloth manufacture, may be suitably cleaned by a short moderate heat cycle without affecting the glass cloth or reducing the strength thereof.

While the production time for a given roll of cloth will vary somewhat with particular operating conditions and equipment available it will be appreciated that the complete treatment time of less than 3 hours is a material improvement over the present practice wherein a matter of several days is required for the complete procedure.

It is to be understood that other alkalis may be substituted for those specifically set forth hereinbefore; that the time and temperature of heating and selection of bleaching agents are susceptible of modification; and that the equipment and other factors may be altered to adapt them to different usages and conditions and, accordingly it is desired to comprehend such modifications within this invention as may fall within the scope of the appended claims.

I claim:

1. In a method of removing oil and starch binder material from glass cloth, the steps of impregnating the glass cloth with an aqueous solution of an alkaline agent having a pH in the range of about 11 to 13, removing the cloth from the solution with binder thereon, and thereafter heating the impregnated cloth in an oxidizing atmosphere to a temperature sufficient to burn off the binder material thereon.

2. In a method of removing oil and starch binder material from glass cloth, the steps of impregnating the glass cloth with an aqueous solution of an alkaline agent having a pH in the range of about 11 to 13, removing the cloth from the solution with binder thereon, and thereafter heating the impregnated cloth in an oxidizing atmosphere to a temperature in the range of 1000° to 1100° F. to a temperature sufficient to burn off the binder material thereon.

3. In a method of removing oil and starch binder material from glass cloth, the steps of impregnating the glass cloth with an aqueous solution of an alkaline agent having a pH in the range of about 11 to 13, removing the cloth from the solution with binder thereon, removing excess alkaline agent from the cloth, and thereafter heating the impregnated cloth in an oxidizing atmosphere to a temperature sufficient to burn off the binder material thereon.

4. In a method of removing oil and starch binder material from glass cloth, the steps of impregnating the glass cloth with an aqueous solution of an alkaline agent having a pH in the range of about 11 to 13, removing the cloth from the solution with binder thereon, and thereafter heating the impregnated cloth in an oxidizing atmosphere to a temperature in the range of 850° to 900° F. for a time of about 4 minutes to burn off the binder material thereon.

5. A method for the removal of oil and starch binder material from glass cloth comprising the steps of impregnating the glass cloth with an aqueous solution of an alkaline agent having a pH in the range of about 11 to 13, removing the cloth from the solution with binder thereon, removing the excess alkaline agent from the glass cloth, thereafter heating the impregnated cloth in an oxidizing atmosphere to about 650° to 750° F. to burn off the binder material thereon, and then bleaching the cloth to remove any traces of binder material remaining on the cloth.

6. A method for the removal of oil and starch binder material from glass cloth comprising the steps of impregnating the glass with an aqueous solution of an alkaline agent having a pH in the range of about 11 to 13, removing the cloth from the solution with binder thereon, washing excess alkaline agent out of the cloth, heating the impregnated cloth in an oxidizing atmosphere to a temperature in the range of 650° to 750° F. to burn off the binder material thereon, bleaching the cloth to remove all traces of binder and discoloration, and then washing the cloth.

7. A method for the removal of oil and starch binder material from glass cloth comprising the steps of impregnating the glass cloth with an aqueous sodium hydroxide solution having a pH in the range of about 11 to 13, removing the cloth from the solution with binder thereon, washing excess alkali out of the cloth, heating the impregnated cloth in an oxidizing atmosphere to a temperature in the range of 650° to 750° F. to burn off the binder material thereon, bleaching the cloth with a sodium hypochlorite solution to remove all traces of binder and discoloration, and washing the cloth with water.

8. A method for the removal of oil and starch binder material from glass cloth comprising the steps of impregnating the glass cloth with an aqueous soda ash solution having a pH in the range of about 11 to 13, removing the cloth from the solution with binder thereon, washing with water to take excess alkali out of the impregnated cloth in an oxidizing atmosphere, heating the cloth to a temperature in the range of 650° F. to 750° F. to burn off the binder material thereof, bleaching the cloth with a sodium hypochlorite solution to remove all traces of binder and discoloration, and washing the cloth with water to remove any traces of hypochlorite remaining thereon.

9. A method for the removal of oil and starch binder material from glass cloth comprising the steps of impregnating the glass cloth with an aqueous ammonia solution having a pH in the range of about 11 to 13, removing the cloth from the solution with binder thereon, heating the impregnated cloth in an oxidizing atmosphere to a temperature in the range of 650° to 750° F. to burn off the binder material thereon, bleaching the cloth with a sodium hypochlorite solution to remove all traces of binder and discoloration, and washing the cloth with water to remove any traces of hypochlorite remaining thereon.

10. A method for the removal of oil and starch binder material from glass cloth comprising the steps of impregnating the glass cloth with an aqueous sodium hydroxide solution having a pH in the range of about 11 to 13, removing the cloth from the solution with binder thereon, removing excess alkali from the glass cloth, and thereafter heating the impregnated cloth in an oxidizing atmosphere to a temperature in the range of about 1000° to 1100° F. for about 2 to 4 minutes to burn off the binder material on the said cloth.

11. A method for the removal of oil and starch binder material from glass cloth comprising the steps of impregnating the glass cloth with an aqueous sodium hydroxide solution having a pH in the range of about 11 to 13, removing the cloth from the solution with binder thereon, removing excess alkali from the glass cloth, heating the impregnated cloth in an oxidizing atmosphere to a temperature in the range of 650° to 750° F. for about 1 minute to burn off the binder material thereon, and bleaching the cloth to remove all traces of binder and discoloration.

12. A method for the removal of oil and starch binder material from glass cloth comprising the steps of impregnating the glass cloth with an aqueous triethanolamine solution having a pH in the range of about 11 to 13, removing the cloth from the solution with binder thereon, removing excess alkali from the glass cloth, heating the impregnated cloth in an oxidizing atmosphere to a temperature in the range of 650° F. to 750° F. for about 1 minute to burn off the binder material thereon, and bleaching the cloth to remove all traces of binder and discoloration.

13. A method for the removal of oil and starch binder material from glass cloth comprising the steps of impregnating the glass cloth with an aqueous morpholine solution having a pH in the range of about 11 to 13, removing the cloth from the solution with binder thereon, removing excess alkali from the glass cloth, heating the impregnated cloth in an oxidizing atmosphere to a temperature in the range of 650° F. to 750° F. for about 1 minute to burn off the binder material thereon, and bleaching the cloth to remove all traces of binder and discoloration.

References Cited in the file of this patent

UNITED STATES PATENTS

| Number | Name | Date |
|---|---|---|
| 2,407,483 | Ebaugh | Sept. 10, 1946 |